US012683877B2

(12) United States Patent
Blanco et al.

(10) Patent No.: US 12,683,877 B2
(45) Date of Patent: Jul. 14, 2026

(54) MAPPING USER AGENTS IN NETWORK TRAFFIC DATA TO CLIENT DEVICES ASSOCIATED WITH A MEDIA EXPOSURE LOCATION

(71) Applicant: The Nielsen Company (US), LLC, New York, NY (US)

(72) Inventors: Oscar Blanco, Oldsmar, FL (US); Alan Lekah, New York, NY (US); Holly McCoy, Oldsmar, FL (US); Meryem Berrada, Oldsmar, FL (US); John Stavropoulos, Columbia, MD (US)

(73) Assignee: The Nielsen Company (US), LLC, New York, NY (US)

( * ) Notice: Subject to any disclaimer, the term of this patent is extended or adjusted under 35 U.S.C. 154(b) by 207 days.

(21) Appl. No.: 18/423,493

(22) Filed: Jan. 26, 2024

(65) Prior Publication Data

US 2025/0211503 A1     Jun. 26, 2025

Related U.S. Application Data

(60) Provisional application No. 63/612,653, filed on Dec. 20, 2023.

(51) Int. Cl.
*H04L 43/026* (2022.01)
*H04L 43/10* (2022.01)
*H04L 67/50* (2022.01)

(52) U.S. Cl.
CPC ............ *H04L 43/026* (2013.01); *H04L 43/10* (2013.01)

(58) Field of Classification Search
CPC ...... H04L 43/026; H04L 43/10; H04L 67/535
See application file for complete search history.

(56) References Cited

U.S. PATENT DOCUMENTS

| | | | |
|---|---|---|---|
| 6,639,611 | B1 | 10/2003 | Leduc |
| 7,702,309 | B2 | 4/2010 | Faccin et al. |
| 7,886,033 | B2 | 2/2011 | Hopmann et al. |
| 8,484,550 | B2 | 7/2013 | Gulwani et al. |

(Continued)

OTHER PUBLICATIONS

Superuser, "How Can I Monitor Network Traffic in an All Mac Home Network?" [https://superuser.com/questions/149974/how-can-i-monitor-network-traffic-in-an-all-mac-home-network], retrieved Mar. 25, 2019, 7 pages.

(Continued)

*Primary Examiner* — Kamal M Hossain

(57) ABSTRACT

In one example, a method is described. The method includes: obtaining network traffic data including at least one user agent, where the user agent is associated with a client device coupled to a network at a media exposure measurement location, and where the user agent comprises a string of characters defining client device attributes, comparing one or more of the client device attributes to candidate device attributes stored in an audience measurement database, based on the comparison, selecting, from a set of candidate device attributes, a set of target device attributes corresponding to a target device identifier, determining a number of occurrences of the set of target device attributes in the network traffic data, and based on a determination that the number of occurrences is above a threshold, outputting the target device identifier as the device identifier that corresponds to the user agent.

20 Claims, 3 Drawing Sheets

(56) References Cited

U.S. PATENT DOCUMENTS

| | | | |
|---|---|---|---|
| 8,693,473 B2 | 4/2014 | Harjanto | |
| 8,842,697 B2 | 9/2014 | Pigeon | |
| 8,884,742 B2 | 11/2014 | Gits et al. | |
| 9,113,286 B1 | 8/2015 | Adams et al. | |
| 9,277,278 B2 | 3/2016 | Barney et al. | |
| 9,331,975 B2 | 5/2016 | Besehanic | |
| 9,363,558 B2 | 6/2016 | Meraviglia | |
| 9,491,077 B2 | 11/2016 | Ahlers et al. | |
| 9,647,779 B2 | 5/2017 | Besehanic | |
| 9,756,133 B2 | 9/2017 | Harjanto et al. | |
| 9,848,375 B2 | 12/2017 | Gould et al. | |
| 9,900,654 B2 | 2/2018 | Meraviglia | |
| 10,078,846 B2 | 9/2018 | Besehanic et al. | |
| 10,237,294 B1 | 3/2019 | Zadeh et al. | |
| 10,284,665 B2 | 5/2019 | Besehanic | |
| 11,334,631 B1* | 5/2022 | Lee | G06F 16/2365 |
| 2001/0021037 A1 | 9/2001 | Itoh | |
| 2003/0004971 A1 | 1/2003 | Gong et al. | |
| 2005/0240665 A1 | 10/2005 | Gu et al. | |
| 2006/0101340 A1 | 5/2006 | Sridhar et al. | |
| 2007/0237141 A1 | 10/2007 | Marchese | |
| 2008/0101381 A1 | 5/2008 | Sun et al. | |
| 2009/0119280 A1 | 5/2009 | Waters et al. | |
| 2009/0125615 A1 | 5/2009 | Murray et al. | |
| 2010/0176962 A1 | 7/2010 | Yossef | |
| 2010/0205037 A1 | 8/2010 | Besehanic | |
| 2010/0241744 A1 | 9/2010 | Fujiwara | |
| 2010/0257548 A1 | 10/2010 | Lee et al. | |
| 2011/0185055 A1 | 7/2011 | Nappier et al. | |
| 2012/0151079 A1* | 6/2012 | Besehanic | H04H 60/45 709/231 |
| 2012/0215621 A1 | 8/2012 | Heffernan et al. | |
| 2012/0221716 A1 | 8/2012 | Halevi et al. | |
| 2012/0324567 A1 | 12/2012 | Couto et al. | |
| 2013/0007236 A1 | 1/2013 | Besehanic | |
| 2013/0044760 A1 | 2/2013 | Harjanto | |
| 2013/0060815 A1 | 3/2013 | Saeki | |
| 2013/0111013 A1 | 5/2013 | Besehanic | |
| 2013/0124309 A1 | 5/2013 | Traasdahl et al. | |
| 2013/0159499 A1 | 6/2013 | Besehanic | |
| 2014/0181317 A1 | 6/2014 | Harjanto et al. | |
| 2014/0273923 A1 | 9/2014 | Papakostas | |
| 2014/0280896 A1 | 9/2014 | Papakostas et al. | |
| 2014/0317270 A1 | 10/2014 | Besehanic | |
| 2015/0032905 A1 | 1/2015 | Celebi et al. | |
| 2015/0143396 A1 | 5/2015 | Meraviglia | |
| 2015/0178769 A1 | 6/2015 | Mirisola et al. | |
| 2015/0242066 A1 | 8/2015 | Chen | |
| 2015/0373489 A1* | 12/2015 | Li | H04W 4/021 455/456.1 |
| 2016/0007083 A1 | 1/2016 | Gurha | |
| 2016/0065676 A1 | 3/2016 | Mergen | |
| 2016/0072677 A1 | 3/2016 | Gupta et al. | |
| 2016/0112522 A1 | 4/2016 | Abello et al. | |
| 2016/0277794 A1 | 9/2016 | Meraviglia | |
| 2016/0308875 A1 | 10/2016 | Judge et al. | |
| 2017/0244797 A1 | 8/2017 | Besehanic | |
| 2018/0121938 A1* | 5/2018 | Verkasalo | G06Q 30/0242 |
| 2018/0124009 A1 | 5/2018 | Kerkes et al. | |
| 2018/0331915 A1 | 11/2018 | Cave et al. | |
| 2018/0337831 A1* | 11/2018 | Grill | H04W 12/37 |
| 2023/0143232 A1 | 5/2023 | Balazs et al. | |

OTHER PUBLICATIONS

United States Patent and Trademark Office, Final office action, issued in connection with U.S. Appl. No. 15/337,902, mailed on Jan. 17, 2019, 23 pages.

United States Patent and Trademark Office, Final office action, issued in connection with U.S. Appl. No. 15/337,902, mailed on Oct. 8, 2019, 15 pages.

United States Patent and Trademark Office, Non-Final office action, issued in connection with U.S. Appl. No. 15/337,902, mailed on Aug. 16, 2018, 21 pages.

United States Patent and Trademark Office, Non-Final office action, issued in connection with U.S. Appl. No. 15/337,902, mailed on Jun. 6, 2019, 18 pages.

United States Patent and Trademark Office, Non-Final office action, issued in connection with U.S. Appl. No. 15/337,902, mailed on Mar. 1, 2022, 24 pages.

3schools.com. "HTML Tables," publicly posted Oct. 26, 2015, 12 pages.

U.S. Appl. No. 19/234,595, "Updating Device Identifiers of Client Devices Associated with a Media Exposure Measurement Location Using Network Connection Requests," filed Jun. 11, 2025, 72 Pages.

U.S. Appl. No. 19/234,610, "Updating Device Identifiers of Client Devices Associated with a Media Exposure Measurement Location Using Network Connection Requests," filed Jun. 11, 2025, 71 Pages.

United States Patent and Trademark Office, Non-Final Office Action, issued in connection with U.S. Appl. No. 18/800,643, mailed on Feb. 4, 2026, 09 pages.

* cited by examiner

104

106b

Mozilla/5.0 (Macintosh; Intel Mac OS X 10_15_7)...

106a

Mozilla/5.0 (Linux; Android 13; SAMSUNG SM-S918B)...

108

110

NETWORK 120

107

SERVER 150

DATABASE 160

Figure 2:
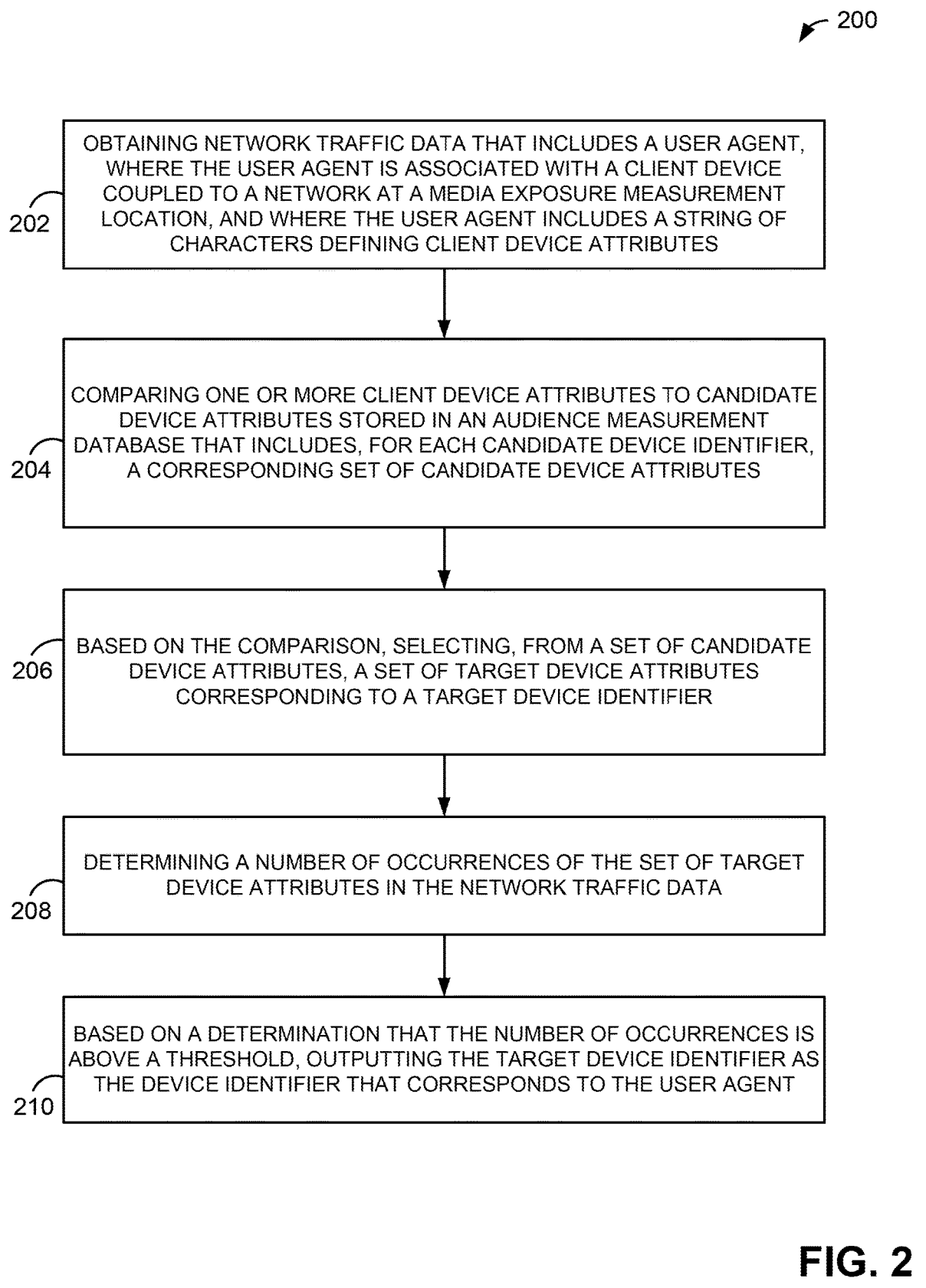

200

OBTAINING NETWORK TRAFFIC DATA THAT INCLUDES A USER AGENT, WHERE THE USER AGENT IS ASSOCIATED WITH A CLIENT DEVICE COUPLED TO A NETWORK AT A MEDIA EXPOSURE MEASUREMENT LOCATION, AND WHERE THE USER AGENT INCLUDES A STRING OF CHARACTERS DEFINING CLIENT DEVICE ATTRIBUTES

202

COMPARING ONE OR MORE CLIENT DEVICE ATTRIBUTES TO CANDIDATE DEVICE ATTRIBUTES STORED IN AN AUDIENCE MEASUREMENT DATABASE THAT INCLUDES, FOR EACH CANDIDATE DEVICE IDENTIFIER, A CORRESPONDING SET OF CANDIDATE DEVICE ATTRIBUTES

204

BASED ON THE COMPARISON, SELECTING, FROM A SET OF CANDIDATE DEVICE ATTRIBUTES, A SET OF TARGET DEVICE ATTRIBUTES CORRESPONDING TO A TARGET DEVICE IDENTIFIER

206

DETERMINING A NUMBER OF OCCURRENCES OF THE SET OF TARGET DEVICE ATTRIBUTES IN THE NETWORK TRAFFIC DATA

208

BASED ON A DETERMINATION THAT THE NUMBER OF OCCURRENCES IS ABOVE A THRESHOLD, OUTPUTTING THE TARGET DEVICE IDENTIFIER AS THE DEVICE IDENTIFIER THAT CORRESPONDS TO THE USER AGENT

MAPPING USER AGENTS IN NETWORK TRAFFIC DATA TO CLIENT DEVICES ASSOCIATED WITH A MEDIA EXPOSURE LOCATION

CROSS-REFERENCE TO RELATED APPLICATIONS

The present disclosure claims priority to U.S. Provisional Application No. 63/612,653, which was filed on Dec. 20, 2023, which is hereby incorporated herein by reference in its entirety.

FIELD OF THE DISCLOSURE

This disclosure relates generally to media monitoring and, more particularly, to methods, systems, and articles of manufacture for monitoring and analyzing network traffic data to identify devices associated with a location where consumers are exposed to media.

Usage and Terminology

In this disclosure, unless otherwise specified and/or unless the particular context clearly dictates otherwise, the terms "a" or "an" mean at least one, and the term "the" means the at least one.

Unless specifically stated otherwise, descriptors such as "first," "second," "third," etc., are used herein without imputing or otherwise indicating any meaning of priority, physical order, arrangement in a list, and ordering in any way, but are merely used as labels or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly that might, for example, otherwise share the same name.

As used herein, the terms "approximately," "substantially," and "about" modify their subjects/values to recognize the potential presence of variations that occur in real world applications. For example, "approximately," "substantially," and "about" can modify dimensions that may not be exact due to manufacturing tolerances or other real-world imperfections, as will be understood by persons of ordinary skill in the art. For example, "approximately," "substantially," and "about" can indicate that such dimensions are within a tolerance range of +/−10%, unless otherwise specified in the below description.

As used herein, the phrase "communicatively coupled," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, the term "computer program," can generally refer to a program suitable for use in any type of computing environment that can be written in any form of programming language, e.g., compiled or interpreted languages, or declarative or procedural languages. A computer program can be deployed to be executed on one computer or on multiple computers that are located at one site or distributed across multiple sites and interconnected by any appropriate type of data communication network. Generally, a program can be deployed in any form, e.g., as a stand-alone program or as a module, component, subroutine, or other unit suitable for use in a computing environment. In some cases, the term "computer program" can also be described as a software, a software application, an app, a module, a software module, a script, or a code. In some cases, a computer program can correspond to a file in a file system. For example, a computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

As used herein, the term "engine" can be used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

SUMMARY

This specification generally describes systems and methods that can analyze network traffic data in order to map each user agent specified in the network traffic data onto a corresponding device identifier that represents a client device at a residential household (or other type of media exposure measurement location) where consumers are exposed to media. In one example, the consumers can be exposed to digital media through streaming via a network (e.g., the Internet) to any appropriate client device having streaming capabilities, e.g., desktop and laptop computers, tablets, mobile phones, or any other appropriate client device.

The systems and methods described in this specification can analyze user agents included in the network traffic data to determine a device identifier that corresponds to the client device that passed the user agent. In some cases, the device identifier can be an identifier determined by any appropriate entity. e.g., an Audience Measurement Entity (AME), and can be stored in a database owned by the entity. In this manner, instead of relying on typical device identifiers specified in the network traffic data, such as a Media Access Control (MAC) address, to identify which client device passed a particular user agent, the systems and methods can automatically identify client devices based on the user agents themselves. In this manner, the systems and methods can bypass various techniques used to obscure, or obfuscate, client device identity in network traffic data, e.g., MAC address randomization, and other obfuscation techniques.

In a first aspect, there is provided a method for mapping a user agent included in network traffic data onto a device identifier associated with a client device at a media exposure measurement location. The method includes: obtaining network traffic data including the user agent. The user agent can be associated with the client device coupled to a network at the media exposure measurement location and can include a string of characters. The method further includes: selecting one or more portions of the string of characters. The method further includes: comparing the one or more portions of the string of characters to an audience measurement database including one or more attributes for each client device of multiple client devices associated with the media exposure measurement location to determine whether the audience measurement database includes a candidate device identifier.

The method further includes: based on determining that the audience measurement database includes the candidate device identifier, selecting one or more candidate attributes associated with the candidate device identifier from the audience measurement database. The method further includes: determining a number of occurrences of the one or more candidate attributes of the candidate device identifier in the network traffic data. The method further includes: based on a determination that the number of occurrences is above a threshold, outputting the candidate device identifier as the device identifier that corresponds to the user agent.

In a second aspect, there is provided a non-transitory computer-readable storage medium, having stored thereon machine-readable instructions that, upon execution by a processor, cause performance of operations of any preceding aspect.

In a third aspect, there is provided a computing system that includes: a processor, and a non-transitory computer-readable storage medium, having stored thereon machine-readable instructions that, upon execution by the processor, cause performance of operations of any preceding aspect.

BRIEF DESCRIPTION OF THE DRAWINGS

FIG. 2 is a flow chart of an example method.

DETAILED DESCRIPTION

I. Overview

Figure 1:
FIG. 1 is an illustration of an example user agent mapping system in which various described operations can be implemented.

Audience Measurement Entities (AMEs) are entities that collect data about media consumption by consumers, referred to herein as "media exposure data," for various purposes. Generally, media exposure data can characterize who is consuming media and what type of media is being consumed. In one example, media exposure data can include data that identifies media (e.g., metadata, codes, signatures, watermarks, etc.), data that identifies consumers (demographic information, usernames, etc.) and, in some cases, data that identifies means by which the media was presented to the consumer (e.g., an identifier of an application, time/duration of use of the application, etc.). Media exposure data collected by the AMEs can be used by other entities such as advertisers to improve the effectiveness of their advertising campaigns, and broadcasters to gain a deeper insight into channel viewership.

Throughout this specification, the term "media" can refer to any type of content item (e.g., television programs, movies, websites, etc.) delivered to a consumer via any appropriate distribution channel, e.g., television, radio, publishing/streaming via the Internet, or any other appropriate distribution channel. The term "digital media" can refer to a subset of media that includes those content items that are accessible via the Internet. As a particular example, digital media can be streamed via the Internet to devices such as desktop and laptop computers, tablets, mobile phones, and Connected Television (CTV).

AMEs can collect media exposure data for digital media by using a streaming meter. Throughout this specification, a "streaming meter" can refer to a device that can be coupled to a network at a consumer household and can monitor network traffic to collect network traffic data. The streaming meter can be in the form of a separate unit (e.g., separate from a modem, a router, or any other network access device at the consumer household), can be installed at any appropriate location in the consumer household, and can be coupled to any other device at the household through a wired, or wireless, connection. For example, the streaming meter can be coupled to an Internet access point (e.g., a router) and can monitor network traffic passing through the access point.

Generally, "network traffic data" can include a variety of different network traffic features and device identifiers associated with devices coupled to a network. The device identifiers can include, e.g., IP addresses, MAC addresses, and any other appropriate device identifiers. The network traffic features can include, e.g., URLs, domain names, user agents, Multipurpose Internet Mail Extension (MIME) types, bandwidth, and any other appropriate network traffic features. Throughout this specification, the term "user agent" can refer to a string of characters that specifies an identification of an application and/or software used to access digital media. A user agent string can specify, e.g., a type of browser used to access the digital media, a type of operating system installed on the device used to access the digital media, and/or any other appropriate parameter or combination of parameters. The term "domain name" can refer to, e.g., a unique address that is used to access a webpage through a browser.

By monitoring network traffic using the streaming meter, AMEs collect media exposure data which can then be used by advertisers, broadcasters, and other entities, for various purposes, as described above.

AMEs enroll consumers who consent to being monitored into a registered consumer panel. Then, AMEs can install and maintain various media monitoring and media tracking equipment, including streaming meters, in registered panelist's households. As part of the enrollment process, AMEs can collect various types of information directly from the consumers about their household, e.g., types of devices used by the consumers to access media at the household, demographic information about the consumers (e.g., age, gender, etc.), and any other appropriate information. This information obtained directly from the consumers can form a part of the media exposure data collected by the AMEs, as described above.

Specifically, the AMEs can collect information defining device attributes for client devices used by the consumers at the media exposure measurement location to access media. The device attributes can include, for example, a type of the client device, a model of the client device, a make of the client device, an operating system associated with the client device, and any other appropriate device attribute. The AMEs can store this information in an audience measurement database. As used herein, the term "candidate device attributes" can generally refer to those device attributes of the client devices that are stored in the audience measurement database and, in some cases, are provided directly by the consumers during enrollment into the panel by an AME, such as via a web portal to which the AME provides panelists with access. As used herein, the term "client device attributes" can generally refer to those device attributes of the client devices that are defined by the user agents included in the network traffic data. The audience measurement database need not necessarily include typical device identifiers, such as IP addresses and MAC addresses, but can instead specify any other appropriate device identifiers represented in any appropriate manner, e.g., as an alphanumeric sequence, or in any other appropriate manner.

In some cases, AMEs can associate data collected directly from consumers, e.g., during consumer enrollment into the panel, with one or more network traffic features collected by the streaming meter by monitoring network traffic at the residential household. As a particular example, AMEs can associate a MAC address of a device at the residential household specified by the network traffic data with demographic information about the consumer who owns and/or uses the device, as indicated by the information provided directly by the consumer during enrollment into the panel. In this manner, the AMEs can generate the media exposure data that provides a mapping between the media being consumed through the device at the residential household and the demographic information of the consumer who is exposed to media through the device.

However, in some cases, the network traffic data may not accurately associate network traffic features corresponding to a network activity of a client device with a device identifier of the client device specified in the network traffic data. In other words, the MAC address specified in the network traffic data may not be a "true" MAC address of the client device. This client device identity obfuscation can be caused by MAC address randomization that uses a randomized MAC address in place of a "true" MAC address when the client device is connected to a network.

Other factors that can lead to the client device identity being obfuscated in the network traffic data can include: the device settings being erased or reset, the device not connecting to the network for a prolonged period of time, or the device going through a factory reset. In each of these situations, the identity of the client device can be obfuscated in the network traffic data. Accordingly, AMEs may not be able to accurately determine the identity of the device associated with the network activity in the network traffic data, thereby preventing the AMEs from accurately mapping information about the media being consumed through the device onto the demographic information of the consumer to generate media exposure data.

The systems and methods described in this specification can analyze the network traffic data associated with the set of devices at the residential household to map user agents specified in the network traffic data onto device identifiers determined by the AMEs. By automatically identifying client devices based on the user agents, the systems and methods described in this specification can provide client device mappings onto media consumption information with greater accuracy and using fewer computational resources (e.g., memory and computing power) than other conventional systems. Moreover, AMEs can use the mappings to generate media exposure data with greater accuracy, thereby allowing broadcasters and advertisers to make effective advertising/media inventory optimization decisions.

II. User Agent Mapping System Architecture

FIG. 1 illustrates an example user agent mapping system 100 in which various described operations can be implemented. The system 100 includes a media exposure measurement location 104, e.g., a residential household of a consumer who is a registered panelist with an AME, or any other appropriate location where consumers are exposed to media.

The media exposure measurement location 104 can include different types of client devices coupled to a network 120 at the location. The network 120 can be, e.g., a local area network (LAN), a wide area network (WAN) (e.g., the Internet), or any other appropriate type of network. The client devices at the media exposure measurement location 104 can include, e.g., a mobile phone 107, a laptop computer 108, or any other appropriate client device.

As described above. AMEs can collect media exposure data for digital media by using a streaming meter 110. The streaming meter 110 is coupled to the network 120 at the location 104 and is configured to monitor network traffic to collect network traffic data. For example, the streaming meter 110 can be coupled to an Internet access point (e.g., a router) and can monitor network traffic passing through the access point. Generally, the streaming meter 110 can be coupled to the network 120 and configured to monitor the network traffic in any appropriate manner.

As described above, the network traffic data can include at least one user agent associated with one or more client devices at the media exposure measurement location 104. The user agent can be a string of characters that defines one or more client device attributes, e.g., a type of the client device, a model of the client device, a make of the client device, an operating system associated with the client device, a browser/application on the client device, or any other appropriate client device attribute. Specifically, one or more parts of the string of characters can each define a respective client device attribute. As illustrated in FIG. 1, the mobile device 107 is associated with a first user agent 106*a*, while the laptop computer 108 is associated with a second user agent 106*b*.

For example, the first user agent 106*a* associated with the mobile device 107 can be represented by the following string of characters:

Mozilla/5.0 (Linux; Android 13; SAMSUNG SM-S918B) AppleWebKit/537.36 (KHTML, like Gecko) Samsung-Browser/21.0 Chrome/110.0.5481.154 Mobile Safari/537.36

As another example, the second user agent 106*b* associated with the laptop computer 108 can be represented by the following string of characters:

Mozilla/5.0 (Windows NT 10.0; Win64; x64) Apple Web-Kit/537.36 (KHTML, like Gecko) Chrome/120.0.0.0 Safari/537.36

The user agent mapping system 100 can process the network traffic data that includes the user agents 106 collected by the streaming meter 110 and map the user agents 106 onto respective device identifiers (e.g., as defined by an AME or other entity) of the client devices, e.g., the mobile phone 107 and the laptop computer 108. In this manner, the system 100 can bypass MAC address randomization and other client device identity obfuscation techniques.

The user agent mapping system 100 can further include a server 150 that can be implemented by one or more computers located in one or more locations. In one example, the server 150 can be located remotely from the media exposure measurement location 104, and can be operated by an AME. The server 150 can be communicatively coupled to the streaming meter 110 and can be configured to receive the network traffic data from the streaming meter 110. The server 150 can communicate with the streaming meter 110 in any appropriate manner, such as through Internet messages (e.g., a HyperText Transfer Protocol (HTTP) request(s)) that include data obtained by the streaming meter 110. Other example modes of communication between the streaming meter 110 and the server 150 can include an HTTP Secure protocol (HTTPS), a file transfer protocol (FTP), a secure file transfer protocol (SFTP), or any other appropriate mode of communication.

The user agent mapping system 100 can further include an audience measurement database 160. As illustrated in FIG. 1, the audience measurement database 160 can be included in the server 150. Generally, the audience measurement database 160 can be located in any appropriate location, or multiple locations. In some cases, the audience measurement database 160 can be remote from the server 150. The audience measurement database 160 can store information associated with media consumption by consumers at the media exposure measurement location 104. For example, the audience measurement database 160 can store information provided directly by consumers during enrollment into the panel by the AME, such as candidate device attributes, as described above. As another example, the audience measurement database 160 can store network traffic features included in the network traffic data collected by the streaming meter 110. As a particular example, the audience measurement database 160 can specify, for each candidate device identifier (e.g., defined by an AME), a corresponding set of candidate device attributes such as a type of the client device, a model of the client device, a make of the client device, an operating system associated with the client device, and any other appropriate candidate device attribute.

The audience measurement database 160 can additionally or alternatively store any other appropriate information. The audience measurement database 160 can be implemented by any type of memory, storage device, and/or storage disc for storing data such as, for example, flash memory, magnetic media, optical media, solid state memory, hard drive(s), thumb drive(s), etc. Furthermore, the data stored in the audience measurement database 160 may be in any data format such as, for example, binary data, comma delimited data, tab delimited data, structured query language (SQL) structures, or any other appropriate type of data.

The server 150 can process user agents 106 included in the network traffic data collected by the streaming meter 110 and map the user agents 106 onto respective device identifiers (e.g., as defined by an AME or other entity) of the client devices specified in the audience measurement database 160. In this manner, the user agent mapping system 100 can bypass MAC address randomization and other client device identity obfuscation techniques. Example operations of the system 100 are described in more detail next.

III. Example Operations of the User Agent Mapping System

As described above, the server 150 can process user agents 106 included in the network traffic data collected by the streaming meter 110 and map the user agents 106 onto respective device identifiers (e.g., as defined by an AME or other entity) of the client devices specified in the audience measurement database 160. In one example, the server 150 can process multiple user agents 106 included in the network traffic data and extract one or more client device attributes from each of the user agents. Then, the server 150 can determine which of the client device attributes (e.g., model, make, type, etc.) occurs most frequently amongst the user agents and select the target device identifier from the audience measurement database that corresponds to that client device attribute. As a particular example, three user agents can specify the "iPhone®" client device attribute, while two user agents can specify the "Samsung®" client device attribute. Based on this, the server 150 can determine that the client device is likely to be an iPhone®, since this client device attribute occurs most frequently amongst the user agents. The server 150 can accordingly identify a target device identifier in the audience measurement database that corresponds to an iPhone®, and output the target device identifier as the one corresponding to the client device that passed the aforementioned user agents.

In another example, the server 150 can compare one or more client device attributes (e.g., model, make, type) as defined by the user agents 106 to candidate device attributes stored in the audience measurement database 160. The server 150 can compare the client device attributes and the candidate device attributes in any appropriate manner.

As a particular example, the server 150 can select a client device attribute defined by the user agent 106 and search the audience measurement database 160 for a candidate device attribute that can substantially match the client device attribute. For example, if at least 50%, at least 60%, at least 70%, at least 80%, at least 90%, or at least 99% of characters representing the client device attribute in the user agent are the same as the characters representing the candidate device attribute in the audience measurement database 160, the server 150 can determine that the client device attribute substantially matches the candidate device attribute. In some cases, if all the characters representing the client device attribute are the same as the characters representing the candidate device attribute, the server 150 can determine that the client device attribute substantially matches the candidate device attribute. The server 150 can repeat this process for each client device attribute defined by the user agent 106. Generally, the server 150 can determine that the client device attribute matches the candidate device attribute in any appropriate manner.

Based on the comparison, the server 150 can select from the audience measurement database 160 a set of target device attributes corresponding to a target device identifier. The target device identifier in the audience measurement database 160 can be a device identifier that, e.g., returns the largest number of matches between the client device identifiers and candidate device identifiers. For example, if the model, make, and type of the client device as specified by the client device attributes defined in the user agent 106 matches the model, make, and type of the client device as specified by the candidate device attributes in the audience measurement database 160, the server 150 can select the device identifier of the client device specified in the audience measurement database 160 as the target device identifier. The set of candidate device attributes associated with the target device identifier (e.g., the device identifier selected by the server 150) in the audience measurement database 160 are referred to as a set of target device attributes.

The server 150 can use the set of target device attributes selected from the audience measurement database 160 to analyze the network traffic data collected by the streaming meter 110. For example, the server 150 can determine a number of occurrences of the set of target device attributes in the network traffic data. That is, the server 150 can determine a number of occurrences of each of the target device attributes in other user agents included in the network traffic data. In some cases, the server 150 can determine a number of occurrences of target device attributes in combination, e.g., the number of times the model of the client device is specified in combination with the type of the client device in each user agent included in the network traffic data. In some cases, the server 150 can generate a confidence score that can be, e.g., a combination of the number of times each target device attribute appears on its own in the network traffic data and the number of times the target device attributes appear in pairs in the network traffic data. A higher confidence score can represent a higher likelihood that the target device identifier selected by the server 150 is a "true" device identifier of the client device. As an example, a confidence score can be presented on a scale of one to one hundred, with one hundred indicating the highest confidence and one indicating the lowest confidence.

The server 150 can compare the number of occurrences of the set of target device attributes in the network traffic data to a threshold. The threshold can be any appropriate numerical value, e.g., 1 occurrence, 5 occurrences, 10 occurrences, or any other appropriate number of occurrences. In some cases, the server 150 can compare the confidence score to a confidence threshold, which can be any appropriate numerical value.

Based on a determination that the number of occurrences (or the confidence score) is above the threshold, the server 150 can output the target device identifier specified in the audience measurement database 160 as the device identifier that corresponds to the user agent in the network traffic data.

In one example, the server 150 can output the target device identifier by presenting the target device identifier on a user interface of an application programming interface (API) made available by the server 150. In another example, the server 150 can output the target device identifier by transmitting the target device identifier to a computing device, a computing system, another server, or any other appropriate computing environment, for presentation on a user interface. In yet another example, the server 150 can output the target device identifier by storing the target device identifier in a database implemented by, e.g., a local memory, a volatile/non-volatile memory, a mass storage, or any other appropriate storage medium.

In some implementations, before performing the comparison between the client device attributes specified in the user agent 106 and the candidate device attributes specified in the audience measurement database 160, the user agent mapping system 100 can determine whether the client device attributes included in the user agent are valid client device attributes or invalid client device attributes. As used herein, a "valid" client device attribute refers to a client device attribute that corresponds to one of multiple standard device attributes, such as standard client device types (e.g., a mobile phone, a tablet, a laptop, etc.), standard client device makes (e.g., "Samsung®," "Apple®," "Huawei®," etc.), standard client device operating systems (e.g., "Android®," "IOS," etc.), standard client device models (e.g., "Galaxy S6," "iPhone® 11 Pro," etc.), and any other standard client device attributes. As used herein, an "invalid" client device attribute refers to a client device attribute that does not represent any known or standard client device attributes, such as makes, types, models, etc.

The user agent mapping system 100 can perform the validation process using a validation engine. The validation engine can be configured to process a portion of the string of characters representing the user agent 106 to generate an output indicating that the portion of the string of characters represents a valid client device attribute or an invalid client device attribute. As a particular example, the validation engine can compare the portion of the string of characters representing the user agent 106 to a device atlas that includes standard device attributes of client devices. Generally, the validation engine can be configured to perform the validation process in any other appropriate manner. By performing the validation process, the system 100 can accurately identify portions of the user agent string that represent standard client device attributes which can then be efficiently and effectively compared with the candidate device attributes in the audience measurement database 160.

FIG. 2 is a flow chart of an example method 200. Method 200 can be carried out by a system of one or more computers located in one or more locations. For example, the server 150 described above with reference to FIG. 1, appropriately programmed in accordance with the specification, can perform method 200.

At block 202, method 200 includes obtaining network traffic data including at least one user agent. The user agent can be associated with a client device coupled to a network at a media exposure measurement location. The user agent can include a string of characters defining client device attributes of the client device. The client device can be, e.g., a mobile phone. In some cases, the network traffic data can be collected by a streaming meter that is located at the media exposure measurement location and that is communicatively coupled to the client device. The streaming meter can be configured to monitor the network to collect the network traffic data.

At block 204, method 200 includes comparing one or more of the client device attributes to candidate device attributes stored in an audience measurement database. The audience measurement database includes, for each of multiple candidate device identifiers, a corresponding set of candidate device attributes. In some cases, the one or more client device attributes can include one or more of: a type of the client device, a model of the client device, a make of the client device, or an operating system associated with the client device. In some cases, the set of candidate device attributes in the audience measurement database can be provided by users of devices associated with the media exposure measurement location.

At block 206, method 200 includes, based on the comparison, selecting, from a set of candidate device attributes, a set of target device attributes corresponding to a target device identifier. For example, method 200 can include determining that at least some of the client device attributes defined by the user agent substantially match at least some of the candidate device attributes in the audience measurement database.

At block 208, method 200 includes determining a number of occurrences of the set of target device attributes in the network traffic data. For example, method 200 can include selecting a first target device attribute and a second target device attribute, and determining a number of occurrences of a combination of the first target device attribute and the second target device attribute in the network traffic data.

At block 210, method 200 includes, based on a determination that the number of occurrences is above a threshold, outputting the target device identifier as the device identifier that corresponds to the user agent.

In some implementations, before comparing one or more of the client device attributes to candidate device attributes, method 200 can include validating that the client device attributes represented by the user agent represent valid device attributes. For example, method 200 can include selecting one or more portions of the string of characters, each portion of the string of characters defining a respective client device attribute. Then, method 200 can include providing the one or more portions of the string of characters to a validation engine. The validation engine can be configured to, for each of the one or more portions of the string of characters, process the portion of the string of characters to generate an output indicating that the portion of the string of characters represents a valid client device attribute or an invalid client device attribute.

In some implementations, method 200 can further include determining a confidence score for the target device identifier, and outputting the confidence score in addition to the target device identifier that corresponds to the user agent.

IV. Example Computing Device

Any one or more of the above-described components, such as the server 150, can take the form of a computing device, or a computing system that includes one or more computing devices.

Figure 3:
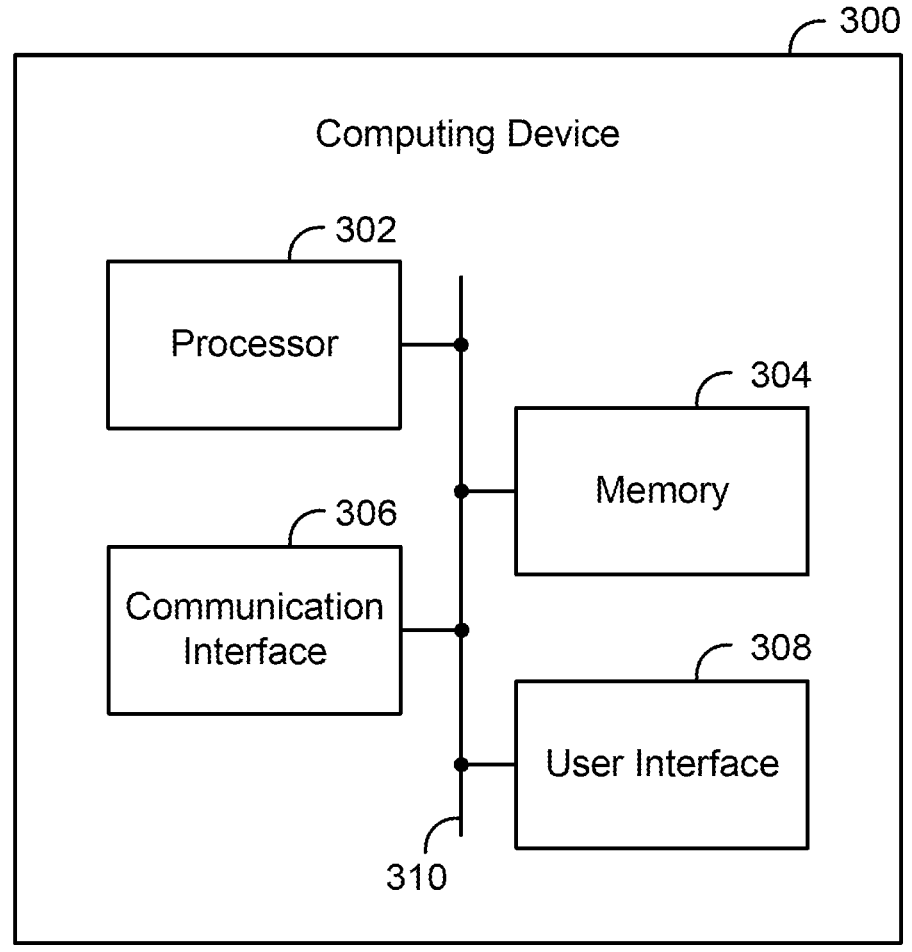
FIG. 3 is a simplified block diagram of an example computing device.

FIG. 3 is a simplified block diagram of an example computing device 300. The computing device 300 can be configured to perform one or more operations, such as the operations described in this disclosure. As shown, the computing device 300 can include various components, such as a processor 302, memory 304, a communication interface 306, and/or a user interface 308. These components can be connected to each other (or to another device, system, or other entity) via a connection mechanism 310.

The processor 302 can include one or more general-purpose processors and/or one or more special-purpose processors.

Memory 304 can include one or more volatile, non-volatile, removable, and/or non-removable storage components, such as magnetic, optical, or flash storage, and/or can be integrated in whole or in part with the processor 302. Further, memory 304 can take the form of a non-transitory computer-readable storage medium, having stored thereon computer-readable program instructions (e.g., compiled or non-compiled program logic and/or machine code) that, upon execution by the processor 302, cause the computing device 300 to perform one or more operations, such as those described in this disclosure. The program instructions can define and/or be part of a discrete software application. In some examples, the computing device 300 can execute the program instructions in response to receiving an input (e.g., via the communication interface 306 and/or the user interface 308). Memory 304 can also store other types of data, such as those types described in this disclosure. In some examples, memory 304 can be implemented using a single physical device, while in other examples, memory 304 can be implemented using two or more physical devices.

The communication interface 306 can include one or more wired interfaces (e.g., an Ethernet interface) or one or more wireless interfaces (e.g., a cellular interface, Wi-Fi interface, or Bluetooth® interface). Such interfaces allow the computing device 300 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 308 can facilitate interaction between computing device 300 and a user of computing device 300, if applicable. As such, the user interface 308 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 308 can include hardware and/or software components that facilitate interaction between the computing device 300 and the user of the computing device 300.

The connection mechanism 310 can be a cable, system bus, computer network connection, or other form of a wired or wireless connection between components of the computing device 300.

One or more of the components of the computing device 300 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 300 can be combined into a single component, and the function described herein for a single component can be subdivided among multiple components.

V. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for mapping a user agent included in network traffic data onto a device identifier associated with a client device at a media exposure measurement location, the method comprising:

obtaining the network traffic data comprising at least one user agent, wherein the user agent is associated with the client device coupled to a network at the media exposure measurement location, and wherein the user agent comprises a string of characters defining client device attributes;

comparing two or more of the client device attributes to candidate device attributes stored in an audience measurement database, wherein the audience measurement database comprises, for each of a plurality of candidate device identifiers, a corresponding set of candidate device attributes;

based on the comparison, selecting, from a set of candidate device attributes, a set of target device attributes corresponding to a target device identifier;

determining a number of occurrences of the set of target device attributes in the network traffic data; and based on a determination that the number of occurrences is above a threshold, outputting the target device identifier as the device identifier that corresponds to the user agent.

2. The method of claim 1, wherein determining the number of occurrences of the set of target device attributes comprises:

selecting a first target device attribute and a second target device attribute; and determining a number of occurrences of a combination of the first target device attribute and the second target device attribute in the network traffic data.

3. The method of claim 1, wherein the client device is a mobile phone.

4. The method of claim 1, further comprising:

selecting one or more portions of the string of characters, each portion of the string of characters defining a respective client device attribute.

5. The method of claim 4, wherein the method further comprises:

providing the one or more portions of the string of characters to a validation engine, wherein the validation engine is configured to, for each of the one or more portions of the string of characters:

process the portion of the string of characters to generate an output indicating that the portion of the string of characters represents a valid client device attribute or an invalid client device attribute.

6. The method of claim 1, wherein the network traffic data is collected by a streaming meter that is located at the media exposure measurement location and that is communicatively coupled to the client device, and wherein the streaming meter is configured to monitor the network to collect the network traffic data.

7. The method of claim 1, wherein the two or more client device attributes comprise two or more of: a type of the client device, a model of the client device, a make of the client device, or an operating system associated with the client device.

8. The method of claim 1, wherein the set of candidate device attributes in the audience measurement database are provided by users of devices associated with the media exposure measurement location.

9. The method of claim 1, further comprising:

determining a confidence score for the target device identifier; and outputting the confidence score in addition to the target device identifier that corresponds to the user agent.

10. The method of claim 1, wherein selecting, from the set of candidate device attributes, the set of target device attributes corresponding to the target device identifier comprises:

determining that at least some of the client device attributes defined by the user agent substantially match at least some of the candidate device attributes in the audience measurement database.

11. A computing system comprising:

a processor; and a non-transitory computer-readable storage medium, having stored thereon program instructions that, upon execution by the processor, cause performance of a set of operations for mapping a user agent included in network traffic data onto a device identifier associated with a client device at a media exposure measurement location, the operations comprising:

obtaining the network traffic data comprising at least one user agent, wherein the user agent is associated with the client device coupled to a network at the media exposure measurement location, and wherein the user agent comprises a string of characters defining client device attributes;

comparing two or more of the client device attributes to candidate device attributes stored in an audience measurement database, wherein the audience measurement database comprises, for each of a plurality of candidate device identifiers, a corresponding set of candidate device attributes;

based on the comparison, selecting, from a set of candidate device attributes, a set of target device attributes corresponding to a target device identifier;

determining a number of occurrences of the set of target device attributes in the network traffic data; and based on a determination that the number of occurrences is above a threshold, outputting the target device identifier as the device identifier that corresponds to the user agent.

12. The system of claim 11, wherein determining the number of occurrences of the set of target device attributes comprises:

selecting a first target device attribute and a second target device attribute; and determining a number of occurrences of a combination of the first target device attribute and the second target device attribute in the network traffic data.

13. The system of claim 11, wherein the client device is a mobile phone.

14. The system of claim 11, wherein the operations further comprise:

selecting one or more portions of the string of characters, each portion of the string of characters defining a respective client device attribute.

15. The system of claim 14, wherein the operations further comprise:

providing the one or more portions of the string of characters to a validation engine, wherein the validation engine is configured to, for each of the one or more portions of the string of characters:

process the portion of the string of characters to generate an output indicating that the portion of the string of characters represents a valid client device attribute or an invalid client device attribute.

16. The system of claim 11, wherein the network traffic data is collected by a streaming meter that is located at the media exposure measurement location and that is communicatively coupled to the client device, and wherein the streaming meter is configured to monitor the network to collect the network traffic data.

17. The system of claim 11, wherein the two or more client device attributes comprise two or more of: a type of the client device, a model of the client device, a make of the client device, or an operating system associated with the client device.

18. The system of claim 11, wherein the set of candidate device attributes in the audience measurement database are provided by users of devices associated with the media exposure measurement location.

19. The system of claim 11, further comprising:

determining a confidence score for the target device identifier; and outputting the confidence score in addition to the target device identifier that corresponds to the user agent.

20. A non-transitory computer-readable storage medium, having stored thereon program instructions that, upon execution by a processor, cause performance of a set of operations for mapping a user agent included in network traffic data onto a device identifier associated with a client device at a media exposure measurement location, the operations comprising:

obtaining the network traffic data comprising at least one user agent, wherein the user agent is associated with the client device coupled to a network at the media exposure measurement location, and wherein the user agent comprises a string of characters defining client device attributes;

comparing two or more of the client device attributes to candidate device attributes stored in an audience measurement database, wherein the audience measurement database comprises, for each of a plurality of candidate device identifiers, a corresponding set of candidate device attributes;

based on the comparison, selecting, from a set of candidate device attributes, a set of target device attributes corresponding to a target device identifier;

determining a number of occurrences of the set of target device attributes in the network traffic data; and based on a determination that the number of occurrences is above a threshold, outputting the target device identifier as the device identifier that corresponds to the user agent.

\* \* \* \* \*